Patented July 19, 1949

2,476,922

UNITED STATES PATENT OFFICE 2,476,922

GLYCIDYL ALLYL PHTHALATE AND RELATED MIXED ESTERS TOGETHER WITH POLYMERS THEREOF

Edward C. Shokal, Oakland, and Lynwood N. Whitehill and Clifford V. Wittenwyler, Berkeley, Calif., assignors to Shell Development Company, San Francisco, Calif., a corporation of Delaware No Drawing. Application June 15, 1946, Serial No. 677,114

20 Claims. (Cl. 260—78.4)

This invention relates to a new class of mixed esters and to polymers of the compounds. More particularly, the invention is concerned with monomeric and polymeric glycidyl allyl diesters of dicarboxylic acids such as glycidyl allyl phthalate.

Prior to the present invention, esters such as diallyl phthalate have been polymerized to resinous polymers. Complete polymerization of such esters gives an insoluble and infusible polymer owing to the fact that the esters are bifunctional in containing two olefinic groups, i. e. two allyl groups. Esters containing only a single olefinic group, as is the case with vinyl acetate, for example, are incapable of being polymerized to an infusible state. Polymers which are infusible and insoluble are of great commercial value since articles, coatings and the like made therefrom have practically complete resistance to all solvents and they are not affected by heat except where the temperature is so high that charring occurs. However, considerable difficulty is encountered in manufacturing articles by polymerizing esters containing two olefinic groups. Upon polymerizing a bifunctional ester like diallyl phthalate, the polymerization progresses with a decrease in percentage of monomer and an increase in percentage of polymer. The polymer which is first formed is fusible as well as being soluble in many common organic solvents. This partial polymer presumably has a molecular structure which is linear and contains unpolymerized or free allyl groups. Further polymerization of the partial polymer results in cross-linking between separate partial polymer molecules by carbon-to-carbon linking through the free allyl groups so that a three-dimensional structure is formed. As cross-linking occurs and progresses, the linear polymer is converted to a gel. The gel is characterized by being insoluble although it can be fused upon application of heat and pressure. Further polymerization of the gel converts it to the insoluble and infusible completely polymerized polymer.

The first-formed linear polymer is the most useful intermediate type since it is fusible and is thus ideally suited for molding operations. It is also soluble in many organic solvents which permits it to be used in coating compositions such as lacquers and paints. The gel polymer is insoluble even in its own monomer and the last-mentioned uses are thus precluded. When an ester like diallyl phthalate is polymerized, the linear polymer forms first, but before all of the monomer is converted to this desired linear polymer, the mixture gels. This phenomenon takes place because of two competitive reactions occurring simultaneously in the polymerizing mixture. One reaction is the linking together of monomeric molecules of diallyl phthalate to form linear polymer molecules. The other is the cross-linking which occurs between linear polymer molecules through the free allyl radicals therein. It is not possible to effect the polymerization so that the first reaction will occur to the exclusion of the second. Both reactions take place through the same type of mechanism, namely, by addition polymerization. As soon as an appreciable concentration of linear polymer is built up, the second reaction may occur with resulting formation of undesired gel even though a large proportion of unpolymerized monomer is present in the system. U. S. Patent No. 2,273,891 provides a method wherein the polymerization is interrupted before gel formation occurs and the unpolymerized monomer is separated from the linear polymer. The resulting monomer-free polymer is then polymerized to the final form. Although such a method is workable and provides intermediate linear polymer for molding operations and coating compositions, it is laborious and inefficient. We avoid all these difficulties through an entirely new approach to the problem. The present invention provides bifunctional esters which are capable of forming three-dimensional polymers having the valuable properties of insolubility and infusibility, but they contain dissimilar polymerizable groups which polymerize by dissimilar reaction mechanisms. The result is that the esters of the invention can be completely polymerized through one group to the exclusion of polymerization of the other group. An entire mass of monomer can be polymerized to linear polymers without the necessity of interrupting the polymerization to avoid polymerization through the second group occurring.

The two dissimilar polymer-forming groups contained in the mixed esters of the invention are an epoxide group and an olefinic group. Thus a typical ester like glycidyl allyl phthalate contains an epoxide group in the glycidyl radical and an olefinic group in the allyl radical. These two dissimilar groups form polymers by entirely different reaction mechanisms. The ester can be subjected to conditions whereby polymerization occurs through one group to the exclusion of polymerization through the second group. The resulting polymer can then be further polymerized under different condtions through the unaffected second group so that an infusible and insoluble polymer is formed. The dissimilarity of the polymer-forming groups enables control over polymer formation so as to produce polymers having a versatility of properties not heretofore possible. For example, glycidyl allyl phthalate can be first subjected to conditions whereby the epoxide-coupling reaction occurs through the epoxide group contained in the glycidyl radical so as to form a linear polymer which is soluble in solvents, some of which are incapable of dissolving the linear polymer of diallyl phthalate. This linear polymer formed by the epoxide-coupling reaction can then be subjected to addition polymerization whereby carbon-to-carbon linking through the free allyl groups of the linear polymer is effected. Or if desired, the mixed ester can be first subjected to addition polymerization through the allyl groups and the resulting polymer is then further polymerized by the epoxide-coupling reaction.

By the epoxide-coupling reaction, reference is made to the reaction which couples together a plurality of epoxide groups whereby a polymer molecule is formed by opening of the epoxide ring and joining together of the plurality of organic residues of the epoxide group by ether linkages. For example, the epoxide-coupling reaction polymerizes ethylene oxide into a polymer which is a polyether. The epoxide-coupling reaction which joins together a plurality of ethylene oxide molecules is illustrated by the following equation which indicates the structural character of the formed polyether:

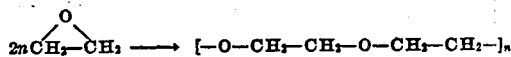

In like manner, glycidyl allyl phthalate upon being subjected to the epoxide-coupling reaction appears to form polymer according to the equation:

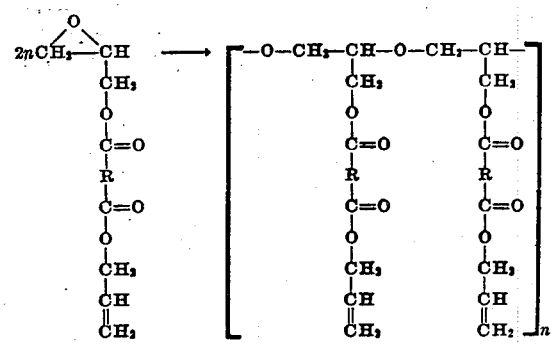

wherein, for brevity, R represents the phenylene radical. The above structural formula indicates the polymer to be a substituted polyether containing free allyl groups. The polymer is soluble in many organic solvents. In addtion, it is fusible and accordingly is adapted to conventional resin molding operations. Owing to the presence of the free allyl groups, the polymer can be subjected to addition polymerization through those allyl groups during the molding thereof whereby it is set or cured into the desirable insoluble and infusible form.

Upon polymerizing glycidyl allyl phthalate so that addition polymerization occurs first, a linear polymer is obtained having a substituted hydrocarbon chain with a free or unchanged epoxide group in the substituents. The term addition polymerization is used herein according to its recognized meaning in the art of polymerization. It refers to the polymerization reaction which olefinic compounds undergo through addition coupling by carbon-to-carbon linking between olefinic groups. Thus, the addition polymerization of monomeric glycidyl allyl phthalate probably occurs according to the following equation:

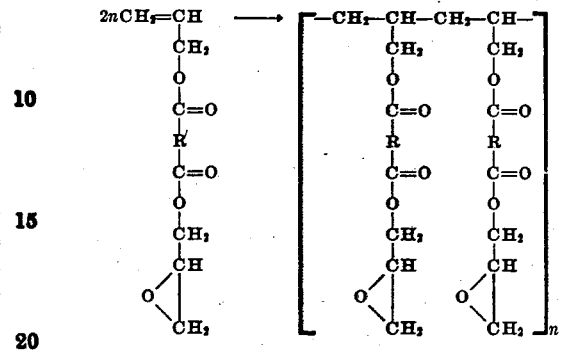

wherein, again for brevity, R represents the phenylene radical. By subjecting this linear polymer to the epoxide-coupling reaction through the epoxide groups, cross-linking will occur so that the desired insoluble and infusible form of polymer is obtained.

The compounds of the invention are mixed esters of polycarboxylic acids in which the ester has the hydrogen atom of one carboxyl group in the polycarboxylic acid replaced by the radical linked to the hydroxyl group in an epoxide-monoalcohol, and the hydrogen atom of another carboxyl group in the acid is replaced by the radical linked to the hydroxyl group in the monohydric alcohol of 2 to 18 carbon atoms containing an olefinic linkage. By an epoxide-monoalcohol, reference is made to a monohydric alcohol which also contains a 1,2-epoxide group with an epoxide oxygen linkage between two vicinal aliphatic carbon atoms which are also joined by a carbon-to-carbon linkage, of which glycidol is a typical compound. In those esters derived from polycarboxylic acids containing more than two carboxyl groups, it is only necessary that the esters have at least one carboxyl esterified with an olefinic radical and that at least one other carboxyl group be esterified with an epoxide-containing radical. Any remaining carboxyl groups can be free or esterified with a saturated hydrocarbon radical such as methyl or ethyl, for example.

The mixed esters can be prepared by several methods. When the compounds are esters with the olefinic radical having a saturated carbon atom linked to the carboxyl group, the esters are best obtained in the following manner. A monoester is first formed by esterifying the polycarboxylic acid with the olefinic alcohol. A metal salt of the monoester is then prepared and the mixed ester is obtained by reacting the metal salt with a halogenated epoxide. This method of preparation is illustrated by the following examples wherein the parts given are by weight.

*Example I*

About 196 parts of maleic anhydride was heated with 240 parts of allyl alcohol at 90° C. for several hours. The resulting solution of allyl hydrogen maleate was cooled to about 60° C. and potassium carbonate added until the solution was neutral whereupon an additional 174 parts allyl alcohol was added. About 1851 parts of epichlorhydrin was then added in small portions over a 30 minute period during which the reaction mixture was heated at 65° C. to 70° C. The excess epichlorhydrin was employed as solvent to permit stirring of the very heavy slurry of precipitated potassium chloride. The resulting pasty mass was stirred at about 110° C. for an 18 hour period after which the solution was filtered while still hot. The filtrate was subjected to flash distillation to remove the volatile components and the residue was distilled from a Claisen flask. The latter distillate amounting to about 254 parts was a mixture of glycidyl allyl maleate and diallyl maleate. It was combined with additional distillate from another batch prepared in the same manner and the mixture was fractionally distilled in vacuo. From a charge of about 330 parts, there was obtained about 128 parts of fairly pure glycidyl allyl maleate and about 125 parts of diallyl maleate. The former was refractionated and about 79 parts were obtained having the following properties:

| | |
|---|---|
| Boiling point, °C. at 0.5 mm | 59–64 |
| Refractive index, 20/D | 1.4728 |
| Bromine No., g. Br$_2$ per 100 g | 69.4 |

*Example II*

Allyl hydrogen phthalate was prepared by refluxing equal parts of allyl alcohol and phthalic anhydride. About 245 parts of the resulting material was dissolved in about 396 parts of acetone and saturated alcoholic sodium hydroxide added until the mixture was neutral to phenolphthalein. The precipitated salt was filtered, washed with acetone and again filtered. The product was then dried at atmospheric temperature in vacuo yielding about 246 parts of product. About 114 parts of this sodium allyl phthalate and 462 parts of epichlorhydrin were mixed and heated at reflux temperature of 117° C. while stirring. In about 2 hours, the mixture lost its thick consistency, but was stirred for an additional 6½ hours. After cooling, the mixture was filtered and the residual salt washed twice with acetone which was combined with the filtrate. The acetone and excess epichlorhydrin were distilled from the solution. A small amount of salt which precipitated was removed by filtration. The filtrate was transferred to a Claisen flask and distilled in vacuo. About 71 parts of product was obtained. The glycidyl allyl phthalate gave the following values on analysis:

| | |
|---|---|
| Boiling point, °C. at 0.3 mm | 141–144 |
| Specific gravity, 20/4 | 1.1958 |
| Refractive index, 20/D | 1.5230 |
| Bromine No., gms. Br per 100 gms | 70 |
| Theoretical | 61 |
| Ester value, equiv. per 100 gms | 0.73 |
| Theoretical | 0.76 |
| Epoxy value, equiv. per 100 gms | 0.34 |
| Theoretical | 0.38 |

The mixed esters of the invention can be made from any suitable polycarboxylic acid. Preferably acids which form anhydrides are used so the above method of preparation can be employed. Thus besides the aforementioned maleic and phthalic anhydride, other representative acid anhydrides include succinic, glutaric, adipic, pimelic, suberic, azelaic, sebacic, mono and polychlorophthalic, mono and dichloromaleic, etc.

A more general method of preparing the monoesters permits any suitable polycarboxylic acid to be used rather than the restricted, but preferred group. According to this method, the diester of the acid and the olefinic alcohol is heated with an equimolal quantity of the free acid whereby the interchange takes place to give the desired monoester. The monoester can also be prepared by esterifying the polybasic acid with the unsaturated alcohol in the presence of at least an equimolal amount of the corresponding diester which is placed in the reaction mixture for the purpose of suppressing its further formation. An esterification catalyst is present such as 1% to 10% of a strong acid like concentrated hydrochloric or sulfuric acid. When the unsaturated alcohol is one containing an unsaturated tertiary carbon atom as in the case with methallyl alcohol, for example, the exchange method is employed rather than the direct esterification method because the acid esterification catalyst tends to rearrange the methallyl alcohol into isobutyraldehyde. Among representative acids from which the compounds of the invention may be prepared by these methods are oxalic, malonic, fumaric, phenyl malonic, dimethyl maleic, succinic, phthalic, melaic, itaconic, mesaconic, citraconic, terephthalic, acetone dicarboxylic, diglycolic, dilactic, dihydracrylic, sulfonyldiglycolic, tartaric, and the like. If desired, the methods may be used to prepare compounds of the invention from acids containing more than two carboxyl groups such as citric, thicarballylic, and the like. The monohydric alcohols used in these methods have the hydroxyl group linked to a saturated carbon atom and contain an olefinic linkage. Among representative alcohols are allyl, methallyl, ethyl allyl, crotyl, propargyl, cinnamyl, 2-chorallyl, chlorocrotyl, methyl vinyl carbinyl, tiglyl, 3-hydroxybuten-1, 3-hydroxypentadien-1,4, 1-hdroxyhexadien-2, 1-hydroxy-2-methylhexen-2, cyclohexenol, oleyl, geraniol, linalool, diallyl carbinol, and the like.

The esters containing at least one free or unesterified carboxyl group prepared by the following methods are converted into their metal salts for introduction into the ester of the radical of the epoxide-mono-alcohol. The metal salts are prepared by neutralizing the acid ester with a metal base such as sodium, potassium, calcium, barium, strontium, or magnesium carbonate, bicarbonate or hydroxide.

The metal salts of the esters are reacted with the halogenated derivatives of the epoxidemonoalcohol in producing the desired mixed esters of the invention. For this purpose, such halogenated epoxides as epichlorhydrin, epibromohydrin, beta-methylepichlorhydrin, beta-ethyl-epichlorhydrin, beta-methylepibromohydrin, 2,3-epoxy-1-chlorobutane, 1,2-epoxy-4-chlorobutane, 2,3-epoxy-4-chloropentane, 1,2-epoxy-3-chloro-2-methylbutane, 1,2-epoxy-4-chlorobutane, 2,3-epoxy-4-chloropentane, 1,2-epoxy-3-chloro-3-phenylpropane, 2,3-epoxy-4-chloro-4-phenylbutane, chlorocyclohexene oxide, chlorocyclopentene oxide and the like are used. The metal salt of the ester is heated at 50° C. to 100° C. as a slurry or solution in suitable media like allyl alcohol, benzene, toluene, octanes, etc., and the halogenated epoxide is slowly added. After the addition of the epoxide compound, the heating is continued to insure completion of the reaction. The formed metal halide salt is filtered from the reaction mixture and the desired mixed ester is recovered by distillation in vacuo.

The esters of the invention can also be obtained by preparing the metal salt of the acid ester and reacting it with the halogenated epoxide without separation or isolation of the metal salt prepared in the first step. In many cases, this single operation procedure gives higher yields of the desired mixed ester than the method wherein the metal salt is isolated. This will be evident from the following example.

Example III

About 103 parts of monoallyl phthalate was dissolved in 340 parts of allyl alcohol and 34.5 parts of potassium carbonate was added. About 9025 parts of epichlorhydrin was added to the mixture over a period of 25 minutes and the mixture was heated at 101° C. for about 20 hours. It was cooled, filtered, and after removing the volatiles by distillation at atmospheric pressure, the residue was distilled from a Claisen flask whereby 105 parts of colorless distillate having a refractive index (20/D) of 1.5218 was obtained. This amounted to a conversion of about 93% to glycidyl allyl phthalate.

When it is desired to obtain a mixed ester with the olefinic radical being linked to the carboxyl group of the ester by an unsaturated carbon atom, a somewhat different method is employed to produce the esters. By reacting a metal salt of the polycarboxylic acid with a limited quantity of the halogenated epoxide, the salt of the ester can be formed. For example, a mol of epichlorhydrin can be reacted with a mol of disodium adipate so that glycidyl sodium adipate is formed. The salt is then carefully acidified with sulfuric acid whereby glycidyl hydrogen adipate is obtained. This compound is then reacted with vinyl acetate to give the desired ester by the interchange reaction. For this purpose, a few tenths of per cent of sulfuric acid and mercuric acetate is added along with a polymerization inhibitor like tannic acid, and the mixture heated. It is then cooled and sodium acetate added after which the reaction mixture is filtered and distilled in vacuo. In place of vinyl acetate, other acetate esters can be used to introduce the olfinic radical into the mixed esters by this reaction such as isopropenyl acetate, allyl acetate, cinnamyl acetate, butadienyl acetate, etc.

A preferred subgroup of the compounds of the invention are the glycidyl alkenyl mixed esters of a dicarboxylic acid wherein the alkenyl group contains 3 to 10 carbon atoms and has the olefinic linkage between the first and second carbon atoms from the valent carbon atom of the alkenyl group. Particularly preferred compounds are those in which the alkenyl radical is the allyl radical. In general, very desirable compounds are obtained from dicarboxylic acids of 4 to 8 carbon atoms, especially the saturated acids. Also particularly suitable are mixed esters having the epoxide-containing radical with 3 to 6 carbon atoms although it is most preferred to have this radical be the glycidyl radical. When it is desired to have an ester capable of very rapid addition polymerization, the vinyl esters are very suitable.

The mixed esters of the invention are polymerized by subjecting them to the epoxide-coupling reaction preferably in the presence of a so-called Friedel-Crafts catalysts such as aluminum chloride, aluminum bromide, zinc chloride, zinc bromide, boron trifluoride, silicon tetrachloride, stannic chloride, stannic bromide, titanium tetrachloride, bismuth trichloride and the like. Stannic chloride has been found to be a particularly preferred catalyst owing to its high activity. About 1% to 10% of catalyst is a suitable quantity to effect the desired polymerization. While the polymerization can be effected through the epoxide-coupling reaction with the pure ester, it is ordinarily preferred to effect the polymerization in the presence of a solvent. The polymerization reaction with the pure ester may become unduly violent and by using solvents, the reaction can be properly controlled. For this purpose, petroleum ether (B. P. 35 to 60° C.) is quite suitable in that it affords a convenient means of controlling the temperature and dissipating the heat of polymerization. The ester is dissolved in the petroleum ether and the solution placed in a vessel fitted with a reflux condenser. The catalyst is added and the temperature will rise no higher than the boiling point of the solvent. Other inert solvents can be used if desired such as chloroform, benzene, ethyl or isopropyl ether, etc. Ordinarily a solution containing about 10% to 50% of the ester is used.

The polymerization can be effected over a considerable range of temperature. Thus, temperatures from −50° C. to about 100° C. are suitable. The character of the polymer is dependent to a considerable extent upon the temperature of polymerization. In general, polymerization at or below atmospheric temperature (about 20° C.) will give waxy solids while polymerization somewhat above that temperature gives viscous liquids. Preferably the esters are subjected to the epoxide-coupling reaction at a temperature of about 0° C. to 60° C.

Another way of preparing the polymers is to treat the monomers with activated clays. The polymers obtained by the epoxide-coupling reaction are soluble in a variety of organic solvents, which solubility enables them to be used in many applications. In general, the polymers are soluble in such dissimilar solvents as lower aliphatic alcohols like methyl and ethyl alcohol; lower ketones like acetone and butanone; and lower aliphatic hydrocarbons like pentane and hexane. Since the polymers contain free olefinic groups capable of addition polymerization, they are well suited to uses in which advantage is taken of their properties of solubility and further polymerizability. One of these uses is as a component in coating compositions wherein a solution of the polymer is applied to the surface of an article, the solvent permitted to evaporate and the polymer subjected to addition polymerization which converts it to the insoluble and infusible polymer providing an extremely resistant protective coating to the article.

The addition polymerization is aided by the presence of a peroxide polymerization catalyst such as benzoyl peroxide, acetyl peroxide, benzoyl acetyl peroxide, tertiary butyl perbenzoate, lauryl peroxide, dibutyryl peroxide, succinyl peroxide, tertiary alkyl hydroperoxides such as tertiary butyl hydroperoxide, di(tertiary alkyl) peroxide such as di(tertiary butyl) peroxide, peracetic acid, perphthalic acid and the like. In further polymerizing the soluble epoxide coupled polymers, about 0.1 to 10% of peroxide catalyst is added and the mixture is heated at 50° C. to 300° C. until the polymerization is complete. Such treatment converts the initial polymers to their insoluble and infusible form. The initial epoxide coupled polymer is well suited for further polymerization in molding operations whereby valuable form-stable molded articles are produced. Compression, injection or transfer molding operations may be employed wherein molding and addition polymerization is effected at pressure of 100 to 3000 or more pounds per square inch. The epoxide coupled polymer can be introduced in such molding operations as viscous liquid or in solid form such as powder, chips, pellets and the like which are fused in the molding operation so as to form a coherent mass. Such polymer is also suitable for preparing laminated articles by impregnating sheets of paper, cotton fabric, etc. with the polymer and then curing an assembly of superimposed sheets.

Although it is preferred to subject the mixed esters to the epoxide-coupling reaction first and then complete the polymerization of the resulting polymer by addition polymerization, the esters can, if desired, be first subjected to addition polymerization and this polymer then further polymerized by the epoxide-coupling reaction. The linear polymer obtained by addition polymerization can be subjected to the epoxide-coupling reaction by baking, if desired, without use of catalyst. Thus, by baking at about 150° C. to 300° C., epoxide-coupling will occur and a substantially insoluble and infusible polymer will be obtained.

The esters can also be polymerized by subjecting them to both the epoxide-coupling reaction and addition polymerization simultaneously. This is best done by mixing the peroxide catalyst with the ester and then adding the Friedel-Crafts metal halide. The vigorous reaction which may ensue upon addition of the latter catalyst will supply heat needed to initiate the addition polymerization.

The following examples are given for the purpose of illustrating in some detail the polymerization of a typical mixed ester of the invention.

*Example IV*

About 94.4 parts of glycidyl allyl phthalate dissolved in 50 parts of chloroform was cooled to 5° C. in a glass vessel equipped with a stirrer. About 2 parts of anhydrous stannic chloride dissolved in 25 parts of chloroform was slowly added to the glycidyl allyl phthalate solution. The maximum temperature during this addition was about 8° C. which was maintained by use of cooling. After 2 hours the solution was washed with water to remove the stannic chloride and the chloroform was removed from the mixture by distillation under vacuum. The polymer amounting to about 47.1 parts was analyzed and gave the following results:

Specific gravity, 20/4 _____ 1.253
Epoxy value, equiv. per 100 g. _____ 0.00
Iodine No. _____ 88.8

About 5% by weight of benzoyl peroxide was added to one portion of the polymer and the mixture was baked at 65° C. for 144 hours. A hard transparent infusible insoluble polymer was obtained.

*Example V*

Glycidyl allyl phthalate was polymerized with 2% by weight of benzoyl peroxide at 65° C. until the refractive index (20/D) rose from 1.525 to 1.544. The resulting product was dissolved in methyl ethyl ketone and metal strips were coated with the solution by dipping therein. The dipped metal strips were baked for 15 to 30 minutes at 200° C. to 250° C. whereby clear transparent continuous films of the polymer on the strips were obtained. The strips could be bent over a ⅛ inch mandrel without failing or separating from the metal. The coatings were hard in not being marred when scratched with a finger nail.

*Example VI*

A portion of the soluble polymer obtained as described in Example IV was dissolved in toluene and coated on sheet metal strips. After baking the coated strips for 15 to 30 minutes at 215° C. to 220° C., a very flexible coating was obtained. When about 2% benzoyl peroxide was added to the solution (based on the polymer content), and the coating test repeated with a 250° C. to 255° C. baking temperature, hard flexible transparent continuous coatings were obtained. They could be bent around a ⅛ inch mandrel without failing, cracking or separating from the metal and could not be marred with a finger nail.

*Example VII*

The solution described in Example V had added thereto about 0.1% by weight of stannic chloride based on the polymer. The solution was applied to metal strips and curing was effected by baking as described above. Hard clear transparent flexible films of the infusible polymer were obtained on the strips.

While the invention has been explained in the foregoing description with particular reference to compounds and polymers of the mixed esters of polycarboxylic acids, the invention is directed in its broader aspects to an organic ester containing an unsaturated radical having an aliphatic carbon-to-carbon unsaturated linkage therein and a radical containing an epoxide group, these radicals being separated in the ester by an intervening carboxyl ester group

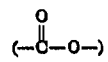

Such compounds can contain but a single carboxyl ester group and the carbonyl part of the carboxyl group can be linked directly to the unsaturated radical or to the epoxide-containing radical. Examples of the former class include such compounds as: glycidyl acrylate, methacrylate, crotonate, oleate, linoleate and like esters thereof wherein the glycidyl radical has been substituted by the previously described epoxide radicals. Very suitable compounds are obtained from acids of drying oils like linseed, tung, and dehydrated castor oil. Such compounds are readily prepared by reacting a salt of the acid such as sodium or potassium salt with the corresponding halogenated derivatives of the epoxide-alcohols. A particularly suitable class of new compounds are those from monocarboxylic acids containing an olefinic linkage between two aliphatic carbon atoms, e. g. glycidyl acrylate. The second class of compounds includes unsaturated alcohol esters of glycidic and related epoxide-containing monocarboxylic acids. Reference is made, for example, to such compounds as vinyl, allyl, methallyl, crotyl, tiglyl and oleyl glycidate, beta-methyl glycidate, epihydrin carboxylate, alpha-methyl glycidate, 3,4-epoxycyclohexane carboxylate, etc. The acids of such esters are readily prepared by reacting the corresponding olefinic acids with hypochlorous acid and then treating the resulting product with lime to close the epoxide ring. The epoxide-containing acid is then esterified with the unsaturated alcohol in the usual fashion or a sodium or potassium salt of the acid can be reacted with the corresponding chloride or bromide of the unsaturated alcohol. These compounds containing only a single carboxyl ester group are polymerized through the two different reaction mechanisms as described hereinbefore with respect to the mixed esters of the polycarboxylic acids. They provide very useful polymers which, when taken to the final state of polymerization, are likewise characterized by being insoluble and infusible.

In order to alter the properties of the polymers, the esters may be copolymerized with various other compounds. Thus, the esters can be mixed with compounds like ethylene oxide, propylene oxide, isobutylene oxide, epichlorhydrin and the like when they are subjected to the epoxide-coupling reaction so as to obtain copolymers with such compounds. Similarly, when the ester or its epoxide-coupled polymer is subjected to addition polymerization, it can be copolymerized with a polymerizable compound containing a vinylidine group such as styrene, acrylonitrile, vinyl chloride, vinyl acetate, methyl methacrylate, diallyl phthalate and the like. The amount of the copolymerizable compound in admixture with the mixed ester or its partial polymer can be varied over wide limits, say from about 1% to 99%, depending upon the properties desired in the resulting copolymer.

We claim as our invention:

1. A mixed ester of a polycarboxylic acid, the ester having the hydrogen atom of one carboxyl group in said polycarboxylic acid replaced by the radical linked to the hydroxyl group in an epoxide-alcohol containing up to 10 carbon atoms, and the hydrogen atom of another carboxyl group in said acid is replaced by the radical linked to the hydroxyl group in a monohydric alcohol of 2 to 18 carbon atoms containing an olefinic linkage between two adjacent aliphatic carbon atoms.

2. A glycidyl, 2-alkenyl mixed ester of a dicarboxylic acid wherein the alkenyl group contains 3 to 10 carbon atoms.

3. A glycidyl, vinyl mixed ester of a dicarboxylic acid.

4. Glycidyl, vinyl phthalate.

5. A glycidyl, allyl mixed ester of a dicarboxylic acid.

6. Glycidyl, allyl phthalate.

7. Glycidyl, allyl maleate.

8. A process of polymerizing a glycidyl, alkenyl mixed ester of a dicarboxylic acid wherein the alkenyl group contains 2 to 18 carbon atoms which comprises heating the ester at a temperature up to 100° C. in the presence of a peroxide polymerization catalyst and a Friedel-Crafts metal halide.

9. A process of polymerizing a glycidyl 2-alkenyl mixed ester of dicarboxylic acid wherein the alkenyl group contains 3 to 10 carbon atoms which comprises subjecting the ester to addition polymerization in the presence of a peroxide polymerization catalyst and subsequently subjecting the resulting polymer to the epoxide-coupling reaction in the presence of a Friedel-Crafts metal halide.

10. A process of polymerizing a glycidyl 2-alkenyl mixed ester of a dicarboxylic acid wherein the alkenyl group contains 3 to 10 carbon atoms which comprises subjecting the ester to the epoxide-coupling reaction in the presence of a Friedel-Crafts metal halide and subsequently subjecting the resulting polymer to addition polymerization in the presence of a peroxide polymerization catalyst.

11. A process of polymerizing glycidyl allyl phthalate which comprises heating the ester in the presence of stannic chloride and then heating the resulting polymer in the presence of a peroxide polymerization catalyst.

12. A polymer of a mixed ester of a polycarboxylic acid, the ester having the hydrogen atom of one carboxyl group in said polycarboxylic acid replaced by the radical linked to the hydroxyl group in an epoxide-alcohol, containing up to 10 carbon atoms, and the hydrogen atom of another carboxyl group in said acid is replaced by the radical linked to the hydroxyl group in a monohydric alcohol of 2 to 18 carbon atoms containing an olefinic linkage.

13. A polymer of a glycidyl, 2-alkenyl mixed ester of a dicarboxylic acid wherein the alkenyl group contains 3 to 10 carbon atoms.

14. A polymer of a glycidyl, vinyl mixed ester of a dicarboxylic acid.

15. A polymer of a glycidyl, vinyl phthalate.

16. A polymer of a glycidyl, allyl mixed ester of a dicarboxylic acid.

17. A polymer of a glycidyl, allyl phthalate.

18. A polymer of a glycidyl, allyl maleate.

19. A polymer of an organic ester containing two radicals separated by one to two intervening carboxyl ester groups of the formula

which have each of the free bonds thereof linked directly to a different carbon atom, one of said radicals being the radical linked directly to the hydroxyl group in a monohydric alcohol of 2 to 18 carbon atoms containing an olefinic linkage and the other of said radicals being the radical linked directly to the hydroxyl group in an epoxide-alcohol containing up to 10 carbon atoms.

20. A polymer of an organic ester containing two radicals separated by one to two intervening carboxyl ester groups of the formula

which have each of the three bonds thereof linked directly to a different carbon atom, one of said radicals being the radical linked directly to the hydroxyl group in a mono-olefinic monohydric alcohol of 2 to 18 carbon atoms and the other of said radicals being the radical linked directly to the hydroxyl group in an epoxide-alcohol containing up to 10 carbon atoms.

EDWARD C. SHOKAL.
LYNWOOD N. WHITEHILL.
CLIFFORD V. WITTENWYLER.

REFERENCES CITED

The following references are of record in the file of this patent:

UNITED STATES PATENTS

| Number | Name | Date |
| --- | --- | --- |
| 2,224,849 | Groll et al. | Dec. 17, 1940 |
| 2,335,813 | Stein | Nov. 30, 1943 |
| 2,399,214 | Evans et al. | Apr. 30, 1946 |